(12) United States Patent
Griessbach et al.

(10) Patent No.: US 6,757,777 B1
(45) Date of Patent: Jun. 29, 2004

(54) BUS MASTER SWITCHING UNIT

(75) Inventors: Gunter Griessbach, Gelenau (DE); Enrico Ramm, Chemnitz (DE); Bernhard Weissbach, Frankenberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/647,704
(22) PCT Filed: Mar. 31, 1999
(86) PCT No.: PCT/DE99/00973
§ 371 (c)(1),
(2), (4) Date: Nov. 22, 2000
(87) PCT Pub. No.: WO99/52245
PCT Pub. Date: Oct. 14, 1999

(30) Foreign Application Priority Data

Apr. 3, 1998 (DE) ............................ 198 15 097

(51) Int. Cl.[7] .................... G06F 13/00; G06F 11/00
(52) U.S. Cl. ..................... 710/316; 710/317; 714/1; 714/11
(58) Field of Search ................. 710/316, 317; 714/1, 2, 6, 8, 11

(56) References Cited

U.S. PATENT DOCUMENTS

| 4,442,502 A | * | 4/1984 | Friend et al. ............... 710/316 |
| 4,484,270 A | * | 11/1984 | Quernemoen et al. ...... 710/317 |
| 5,313,386 A | | 5/1994 | Cook et al. |

FOREIGN PATENT DOCUMENTS

GB 2 146 810 4/1985

OTHER PUBLICATIONS

M. Volz, "Profibus–DP–der Schnelle Bruder. Standardistierte Kommunikation fur die Dezentrale Peripherie", Elektronik, vol. 42, No. 26, Dec. 28, 1993, pp. 50–53, 58–60*.

* cited by examiner

Primary Examiner—Tim Vo
(74) Attorney, Agent, or Firm—Kenyon & Kenyon

(57) ABSTRACT

A switching unit is provided in order to operate in each case one bus master from a group of redundant bus masters on a fundamentally non-redundant bus system, with the special feature of the switching unit being that it is itself operated on the bus to be switched and, in consequence, no special signals are required to switch the bus masters.

13 Claims, 4 Drawing Sheets

BUS MASTER SWITCHING UNIT

FIELD OF THE INVENTION

The present invention relates to a bus master switching unit and to a method for operating redundant bus masters.

BACKGROUND OF THE INVENTION

A number of bus subscribers are normally connected to a bus system, with the data transmission taking place via a bus system in accordance with a defined protocol. A requirement of special data transmission protocols is that at least one of the bus subscribers acts as a so-called bus master, with the bus master actively controlling the transmission protocol.

If the bus master in such a bus system fails, then this normally results in at least one adverse effect on the operation of the other bus subscribers, even if this does not result in failure of all the bus subscribers to operate, since no data transmission via the bus is possible without the bus master.

One possible bus system is, for example, Profibus, while programmable logic controllers can be used as bus masters, for example as central units. The bus can be used to connect the central unit to peripheral units for communication purposes, in particular also to decentralized peripheral units provided directly in the controlled and/or monitored process, with, firstly, the states of the technical process being recorded by the peripheral units and being transmitted cyclically to the central units and, secondly, control instructions being transmitted cyclically to the peripheral units.

SUMMARY

An object of the present invention is firstly to provide a switching unit by means of which one bus master from a group of redundant bus masters can in each case be connected to a non-redundant bus system. Another object of the present invention is to provide a method for operating redundant bus masters on a non-redundant bus system.

This object is achieved by providing an apparatus having a bus master switching unit for connecting one bus master from a group of at least two redundant bus masters to a non-redundant bus system. The bus master switching unit includes at least connections for connecting in each case one bus master and at least one connection to the connection of the non-redundant bus system. The bus master switching unit, includes at least one bus changeover switch and means, i.e., an actuator connected to the bus, for actuating the bus changeover switch, in which case the actuator can be actuated exclusively by the bus master or bus masters, and in which case, depending on the switch position, the bus changeover switch results in one bus master which is connected to the bus master switching unit in each case being connected to the bus.

This object is also achieved by providing a method for operating redundant bus masters on a non-redundant bus system. A bus master switching unit is provided for connecting one bus master from a group of at least two redundant bus masters to the bus system. The bus master switching unit includes at least connections for connecting in each case one bus master and at least one connection to the connection of the non-redundant bus system. The bus master switching unit further includes at least one bus changeover switch and an actuator connected to the bus for actuating the bus changeover switch. The actuator can be actuated exclusively by the bus master or bus masters and wherein, depending on the switch position, the bus changeover switch results in in each case one bus master which is connected to the bus master switching unit being connected to the bus.

The bus master switching unit can be implemented using simple circuitry if the actuator has or have outputs which, when appropriately actuated by the bus master or bus masters, assume(s) a logic state, which is or can be predetermined, for actuation of the bus changeover switch, and thus result in the bus changeover switch being in a defined switch position.

The circuitry implementation of the bus master switching unit is further simplified if the actuator is in the form of application-specific integrated circuits—ASIC—having a number of inputs and outputs, wherein the inputs and outputs can respectively be read to and read from by the respective connected bus master.

When a data transfer produced by the bus master takes place on the bus, a periodic signal change at at least one output from the respective application-specific integrated circuit can be produced and this signal change can be identified for the other bus master via at least one input of the respective application-specific integrated circuit, this makes it possible for the redundant, currently passive bus master to monitor the currently active bus master particularly efficiently. The periodic signal change thus represents an "indication that the active bus master is alive". If no signal change takes place during a time interval which is or can be predetermined, then the passive bus master evaluates this to mean that the active bus master has failed. The passive bus master can then disconnect the failed bus master from the bus, and "install" itself as the bus master on the bus.

If either a data transfer between a first bus master connected to the bus master switching unit and a second bus master connected to the bus master switching unit takes place via the inputs and outputs of the application-specific integrated circuits, or the bus comprises at least one data line and the data line leads to each bus master which can be connected to the bus master switching unit, bypassing the bus changeover switch, it is also possible to transmit to the passive bus master the data being transmitted on the bus. This is done either by the active bus master transmitting the data to the passive bus master via a communication path provided between the application-specific integrated circuits, or by the passive bus master monitoring the bus traffic all the time by means of a direct connection at least to the data line.

DETAILED DESCRIPTION

Figure 1:
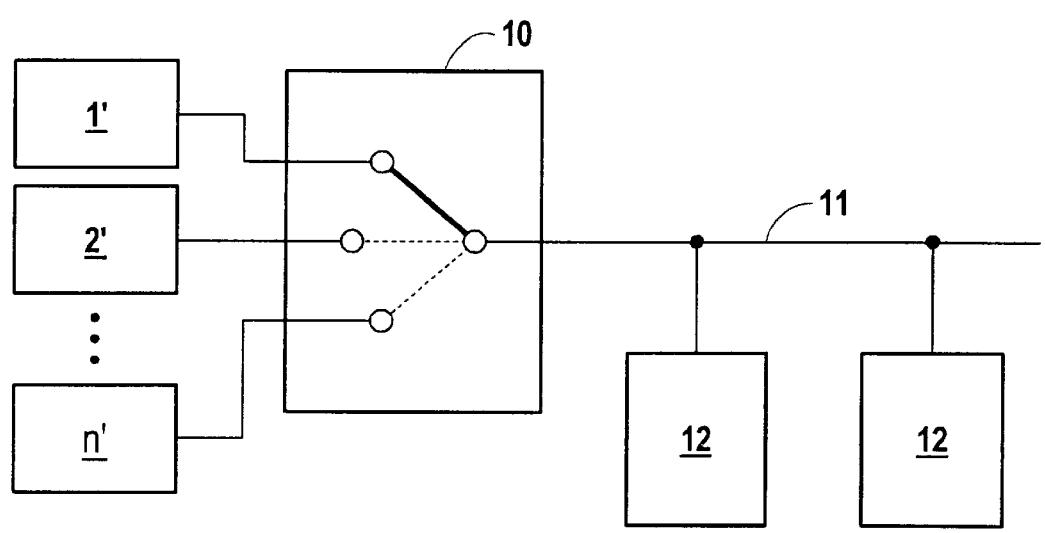
FIG. 1 shows an outline illustration of a bus master switching unit.

According to the illustration in FIG. 1, a number of bus masters 1', 2' ... n' can be connected to a non-redundant bus system 11 by means of a bus master switching unit 10. The bus master switching unit 10 in each case connects one of the bus masters 1', 2' ... n' connected to it to the non-redundant bus system 11 to which, for example, peripheral assemblies 12 can be connected.

In order to explain the exemplary embodiment further, the following text assumes that the non-redundant bus system 11 operates as a synchronous serial bus. In addition to a data line 11' and a clock line, the bus 11 contains two control lines, one alarm line, one ready line, a line for inhibiting the outputs of the peripheral assemblies 12, and the power supply. The individual lines in the bus system 11 are not shown in FIG. 2 (the data line 11' is shown as an individual line only in conjunction with the refinement of the bus master switching unit 10 shown in FIG. 3, which will be described further below).

In principle, the data line 11' loops through all the bus subscribers connected to the bus system 11.

Data are transmitted using a protocol system which supports addressing of the bus subscribers 10, 12 connected to the bus 11, and data transmission for different data lengths.

A BUS-ASIC is provided for connection of simple peripheral assemblies 12, for example a digital input or digital output assembly 12. This BUS-ASIC interprets the bus protocol and, in the operating mode which is relevant in the context of the present invention, provides an interface for 16 digital inputs and 16 digital outputs in the direction of the connected peripheral although, of course, embodiments with more or less than 16 inputs or outputs are also possible; however, normally, the number of inputs or outputs is an integer divisible by eight.

Such a BUS-ASIC is used for controlling or initiating the switching processes in the bus master switching unit 10. As will also be described in the following text with reference to FIG. 2, each bus master 1', 2' . . . n' is connected to such a BUS-ASIC 4, 5 for this purpose.

The bus master 1', 2' . . . n' which actively operates the transmission protocol agreed for the bus system 11 is thus able to receive these 16 input information items via the bus system 11 and, furthermore, can also send the 16 output information items via the bus system 11.

To this end, the input and output channels are assigned addresses which can be or are predetermined. In consequence, each individual bit in the 16 input information items can be read separately, and each individual bit in the 16 output information items can be written separately.

A large number of BUS-ASICs can be operated on the bus 11. However, the BUS-ASICs are not shown in FIG. 1. As will be shown in the following text with reference to the illustration in FIG. 2, the BUS-ASICs which are suitable for operation on the bus 11 are used in a bus master switching unit 10 for connecting to the non-redundant bus system 11 in each case one bus master 1', 2' . . . n' which is connected to the bus master switching unit 10.

If there is now a requirement to design the bus masters 1', 2' for a bus system 11 in a redundant fashion, that is to say with more than one of them, for example with them being duplicated, one bus master 1', 2' always operates actively with the peripheral 12 connected to the bus 11, that is to say it reads inputs and writes outputs.

On the other hand, in order to make it possible for it to change to the active state at any time, the passive bus master 2', 1' has to simulate the operations with the peripheral 12, at least in the memory.

In principle, there are two options for in each case transmitting the information about the respective current states of the process peripheral 12 to the respective passive bus master 2', 1': for the first option, the data representing the current states of the process peripheral are transmitted directly from the active bus master 1', 2' to the passive bus master 2', 1'. For the second option, the passive bus master 2', 1' also interprets the bus protocol and also reads the states of the process peripheral 12, for example the input data. This is referred to as the so-called "monitoring mode".

According to the illustration in FIG. 2, the bus master switching unit 10, referred to for short in the following text as the switching unit 10, has two connections 1, 2 for a respective bus master 1', 2', and one connection 3 for connection of the peripheral assemblies 12 via the non-redundant bus 11 although, of course, embodiments of the switching unit 10 with more than two connections 1, 2 for bus masters 1', 2'—as has already been shown in FIG. 1—and with more than one connection 3 for a bus system 11 are also possible. If more than two bus masters 1', 2' can be connected, the bus changeover switch 6 is, for example, in the form of a multiplexer.

Each bus master connection 1, 2 is assigned a BUS-ASIC 4, 5 which, with regard to the data line, is looped in first place into the chain of peripheral ASICs.

Figure 2:
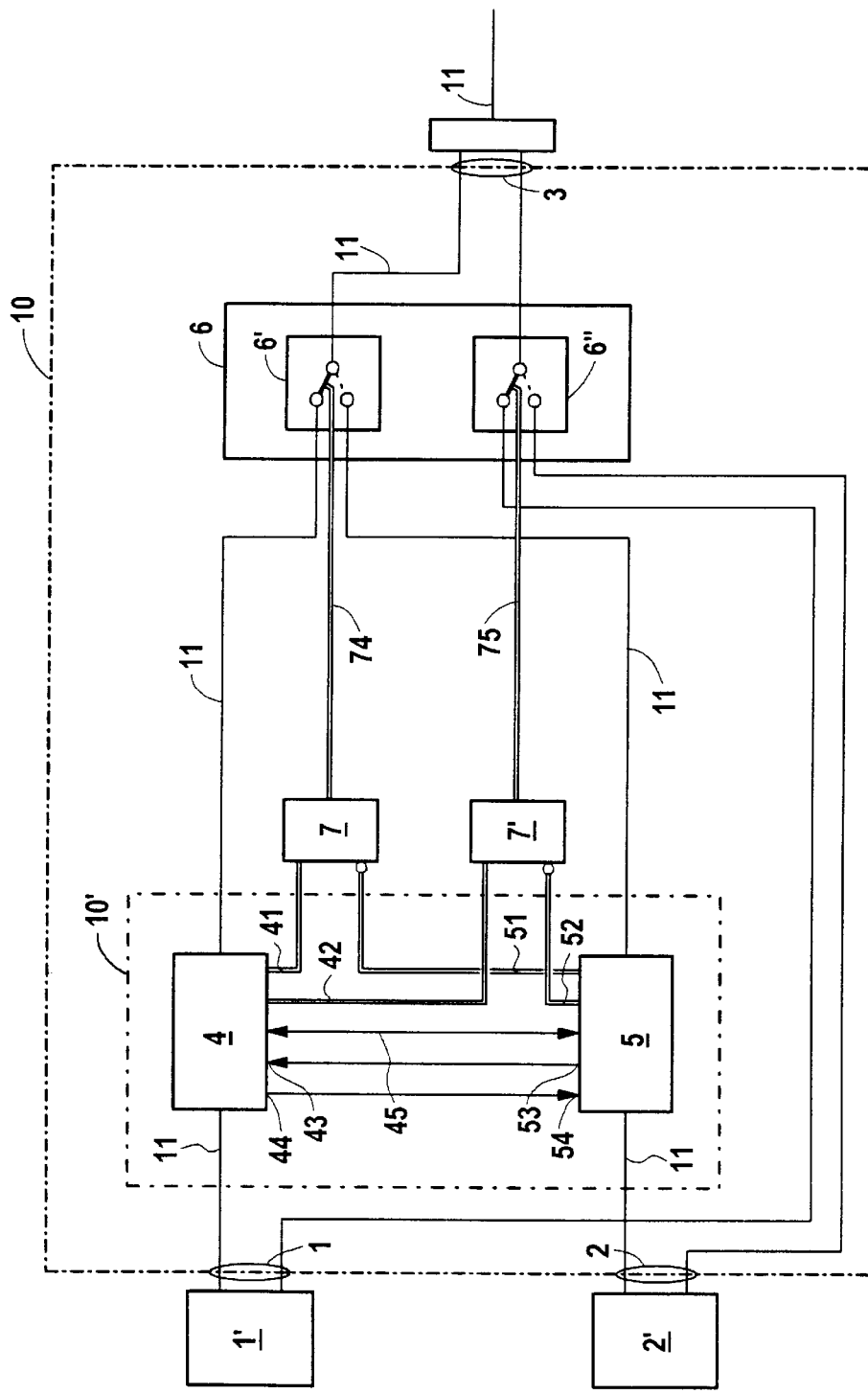
FIG. 2 shows a block diagram of a bus master switching unit.
Figure 3:
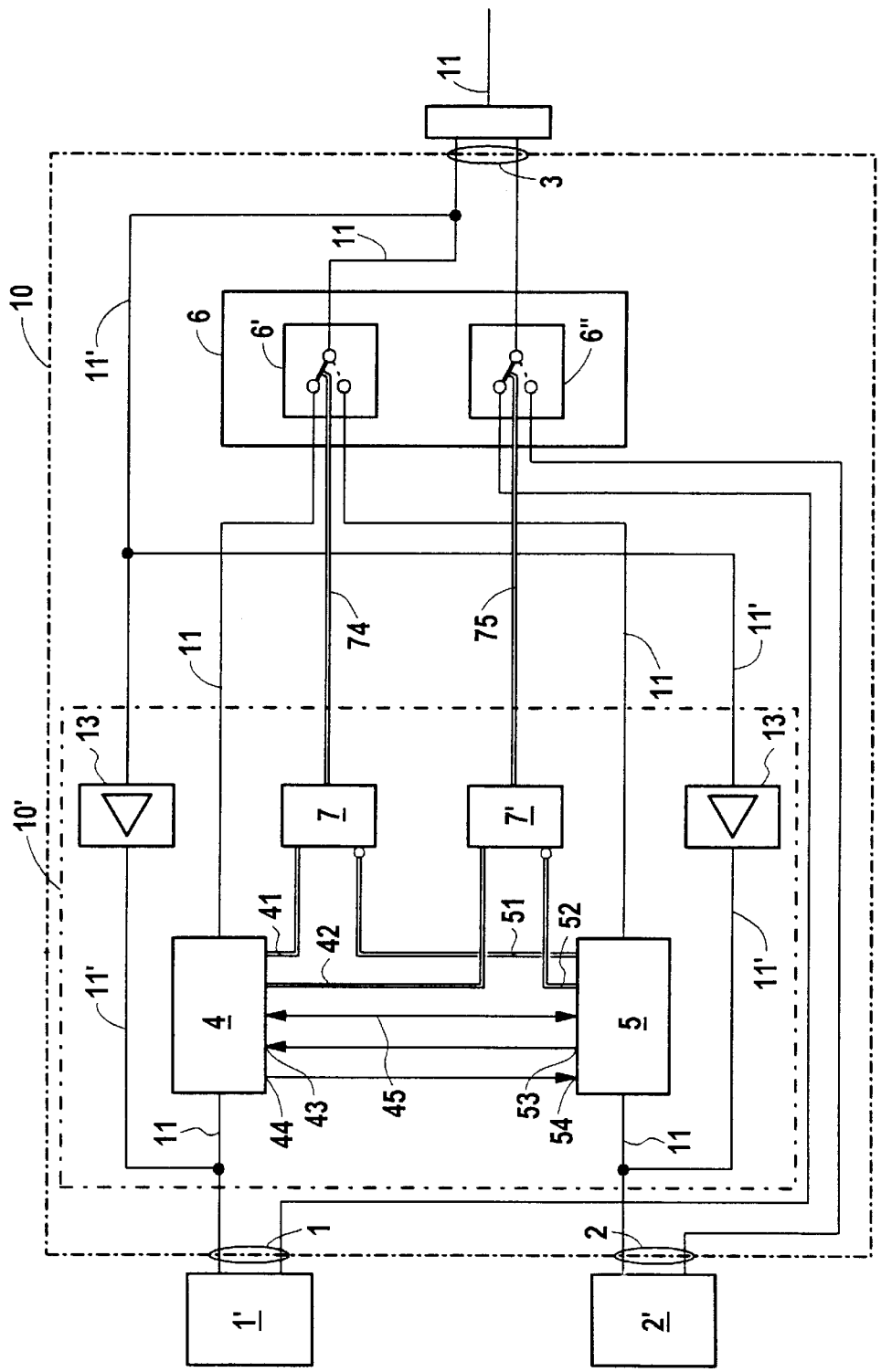
FIGS. 3, 4 show refinements of the bus master switching unit.

In principle, BUS-ASICs are used, like the BUS-ASICs 4, 5 shown in FIG. 2, to connect the peripheral to the bus system 11. A distinction is drawn between bus systems in which the BUS-ASICs are connected in series, and bus systems in which the BUS-ASICs are connected in parallel. When the respective BUS-ASICs are connected in series, they are arranged in a chain, with the BUS-ASICs 4, 5 being arranged, according to the exemplary embodiment, in first place in the chain, that is to say immediately after the respective bus master 1', 2'. The interfaces to the inputs and outputs of the BUS-ASICs 4, 5 form the peripheral side of the BUS-ASIC 4, 5. The BUS-ASICs 4, 5 use this peripheral only for controlling the bus changeover process 6, which is carried out such that it is completely concealed from the user. Real inputs or outputs, that is to say, for example, external sensor systems or actuator systems of a technical process which is to be controlled and/or monitored, can be connected to the downstream BUS-ASICs, which can be connected to the bus 11 outside the bus master switching unit 10.

The actual bus changeover switch 6 is arranged downstream from the BUS-ASICs 4, 5. The bus changeover switch 6 can optionally be used to connect the bus master 1' or the bus master 2' to the peripheral assemblies 12. Since the two BUS-ASICs 4, 5 are arranged upstream of the bus changeover switch 6, each bus master 1', 2' can control the ASIC 4, 5 assigned to it at any time —that is to say irrespective of the current switch position of the bus changeover switch 6.

The bus changeover switch 6 is actuated by means of the individual output bits in the respective 16 output information items from the respective BUS-ASICs 4, 5. The respective logic states of the output bits can be tapped off at connecting points of the BUS-ASICs 4, 5 provided for this purpose. In the exemplary embodiment shown in FIG. 2, the logic states of two output bits from the BUS-ASIC 4 can be tapped off at the connecting points 41, 42 of the BUS-ASIC 4; the logic states of two output bits from the BUS-ASIC 5 can be tapped off analogously at the connecting points 51, 52 of the BUS-ASIC 5.

The logic states of the respective output bits are supplied to switching logic 7, 7' with, firstly, the output bit 41 of the BUS-ASIC 4 and the inverted output bit 51 of the BUS-ASIC 5 being supplied to the switching logic 7 and, secondly, the output bit 42 of the BUS-ASIC 4 and the inverted output bit 52 of the BUS-ASIC 5 being supplied to the switching logic 7'.

The logic AND operation carried out by the switching logic 7, 7' on the respectively supplied signals 41, 51 and 42, 52, respectively, are used to generate switching signals 74, 75 for actuating the switching unit 6, with the switching signal 74 being generated by the switching logic 7 and being intended for actuation of a switching element 6' intended for bus switching, and the switching signal 75 being generated by the switching logic 7' and being intended for actuation of a switching element 6" intended for power supply switching. The switching elements 6', 6" together form the switching unit 6.

One special feature of the implementation according to the exemplary embodiment is that, firstly, both the data lines and the supply lines can be switched and that, secondly, the data lines and the supply lines can, in principle, also be switched separately from one another.

If the signals 41, 42 of the ASIC 4 hold the logic state 1, and the signals 51, 52 of the ASIC 5 hold the logic state 0, the logic operation ([41 AND NOT 51]=["1" AND NOT "0"]=["1" and "1"]="1") in the switching logic 7 results in the switching signal 74 also holding the logic state 1. Analogously, the logic operation ([42 AND NOT 52]=["1" AND NOT "0"]=["1" and "1"]="1") in the switching logic 7 results in the switching signal 75 also holding the logic state 1. These two switching signals 74, 75 result in the switching elements 6', 6" assuming a defined switch position which, for example, results in the bus master 1' being connected to the bus 11.

The complementary state, that is to say the state in which the signals 41, 42 hold the logic state 0 and the signals 51, 52 in each case hold the logic state 1, in each case results in a logic state 0 for the switching signals 74, 75, which correspondingly leads to the switching element 6', 6" assuming a switch position complementary to that in the case described above, also results, for example, in the bus master 2' being connected to the bus 11.

The corresponding individual lines of the bus system 11 are, of course, connected to the switching elements 6', 6"—so that they can produce the desired switching operation. Thus, according to the exemplary embodiment—even if not shown explicitly in FIG. 2—at least the data line, the clock line, the two control lines, an alarm line, a ready line and a line for inhibiting the outputs of the peripheral assemblies 12 can be switched by means of the switching element 6' for bus switching. Furthermore, according to the exemplary embodiment, at least the power supply can be switched by means of the switching element 6" for power supply switching.

The addressing of the 16 input and 16 output channels for each BUS-ASIC 4, 5, and the setting of specific output bits (which this results in) to a logic state which can be predetermined, remain concealed from the user. Since the BUS-ASICs 4, 5 are connected to the bus 11, but do not appear to the user, however, as a bus subscriber, in particular as a separate bus subscriber, the BUS-ASICs 4, 5 are also referred to as virtual bus subscribers 4, 5, as virtual bus peripherals 4, 5, or, for short, as virtual peripherals 4, 5.

The data interchange, that is to say at least the setting of specific output bits to a logic state which can be predetermined, with the so-called virtual peripherals 4, 5 is carried out by the firmware in the respective bus master 1', 2'. The 16 input and 16 output channels of each BUS-ASIC 4, 5 can thus be used to control the bus changeover switch 6.

As is shown in FIG. 2, the BUS-ASICs 4, 5 and the switching logic 7, 7' can be combined to form a switching means 10', and the switching means 10' can be in the form of an application-specific integrated circuit—ASIC.

One special feature of the switching unit 10 is that it is itself operated on the bus 11 to be switched, that is to say no special signals are required for switching. It is thus possible for existing bus masters 1', 2', which are not actually intended for redundant operation, to be switched to form redundant systems.

The switching unit 10 supports the following processes for bus switching and for operation of redundant bus masters 1', 2' on a non-redundant bus system 11:

I.) Monitoring for signs of life:
   One output channel 44, 53 of each ASIC 4, 5 changes between logic 0 and logic 1 when actuated appropriately by the respective bus master 1', 2' in each peripheral access cycle. The output channel 44, 53 is connected to an input channel 43, 54 of the respective other ASIC 5, 4. The other bus master 2', 1' can thus monitor the operation of the bus master 1', 2' producing the output.
   When the ASIC 4 is actuated by the active bus master 1', the output channel 44, for example, changes between logic 0 and logic 1 in each peripheral access cycle. The output channel 44 is connected to the input channel 54 of the other BUS-ASIC 5, so that the passive bus master 2' connected to the BUS-ASIC 5 can identify the signal change by reading the state of the input channel 54. Continual signal changes are regarded as a so-called "sign of life".
   If no single changes occur, the bus master 1', 2' producing the output has failed, and it is necessary to switch the bus master 1', 2' (first switching criterion), with the failed bus master becoming the passive bus master when the switching operation takes place, and its function being taken over by the redundant bus master.

II.) Programmable switching:
   A bus master 1', 2' may, of course, produce a bus master switching operation under program control as well—for example for diagnostic purposes—without any need for the bus master which is to be made passive having failed (second switching criterion).

III.) Data transmission:
   Since the respective passive bus master 2', 1' requires the input information of the peripheral cyclically, it is possible to pass the data to the opposite side, by connecting further output channels to input channels. Control lines are also required to do this. For example, in order to increase the data rate, 8 channels may always be transferred in parallel. The data transmission which can be accomplished in this way takes place via the bidirectional link 45 denoted by the reference number 45 in FIG. 2. However, it is self-evident that the link 45 need not necessarily in practice be provided by a single bidirectional link 45 but by a large number of individual lines, for example eight of them, which are connected from the respective output channels of the first BUS-ASIC 4, 5 to the corresponding input channels of the second BUS-ASIC 5, 4.

IV.) Switching logic:
   The switching logic distinguishes between so-called single mode and a so-called double mode. If one of the bus masters is not present, has not yet been started up or has failed, the redundant bus master is in the single mode. The bus masters use one bit on the link 44, 54 or 43, 53 to inform one another that they are ready to operate. If one of the bus masters 1', 2' is not ready to operate, the other bus master 2', 1' operates in the single mode. The master 1', 2' which is not ready is cyclically asked whether it is ready to operate, until it is ready once again. The change to the double mode then takes place. In the double mode, both bus masters agree before the switching process. In the single mode, such agreement is not possible, and is thus ignored.

V.) Monitoring driver:

If the data transmission does not pass via the virtual peripherals 4, 5, the respective passive bus master 2', 1' can filter out the input information from the transmission protocol. To do this—as is shown in the illustration in FIG. 3—the data line 11' is connected to the bus master 1', 2' independently of the respective switching state of the bus changeover switch 6, by the data line 11' being connected directly to the switching elements 6', 6", bypassing the bus masters 1', 2'. A monitoring driver 13 is in each case provided for decoupling in the branch of the data line 11' which in each case leads to a bus master 1', 2'.

Figure 4:
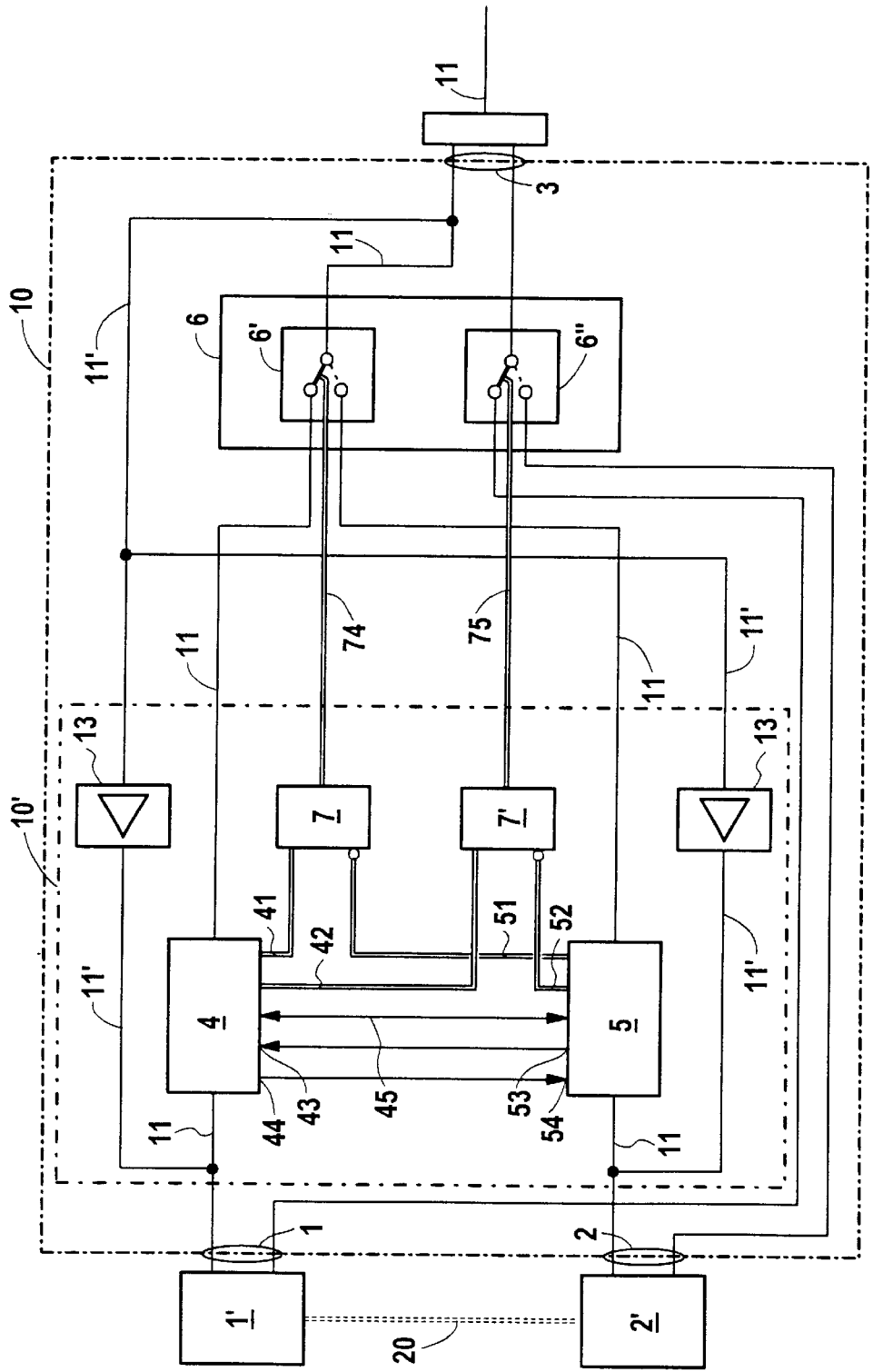

Additional data interchange:

As shown in FIG. 4, a second, additional bus system 20, which allows direct data interchange between the redundant bus masters 1', 2' is also conceivable as a further alternative for data interchange between the bus masters 1', 2'. This additional bus system 20 is also optional, and represents a further advantageous refinement of the invention.

In summary, the present invention can be described, briefly, as follows:

A switching unit 10 is provided in order to operate in each case one bus master 1' from a group of redundant bus masters 1', 2' on a fundamentally non-redundant bus system 11, with the special feature of the switching unit 10 being that it is itself operated on the bus 11 to be switched and, in consequence, no special signals are required to switch the bus masters 1', 2'.

An aspect of the present invention is thus that the switching unit 10 is itself operated on the bus 11 to be switched, that is to say no special signals are required for switching. It is therefore possible to connect existing bus masters, which are actually not intended for redundant operation, to form redundant systems.

What is claimed is:

1. A bus master switching unit for connecting one redundant bus master of at least two redundant bus masters to a non-redundant bus system, comprising:

connections to connect, in each case, one of the redundant bus masters;

at least one connection to the non-redundant bus system;

a bus changeover switch, wherein depending on a switch position of the bus changeover switch, the bus changeover switch connecting one of the redundant bus masters to the non-redundant bus system; and an actuator to actuate the bus changeover switch, the actuator being actuated by at least one of the redundant bus masters.

2. The bus master switching unit according to claim 1, wherein the actuator includes outputs that, when appropriately actuated by the at least one of the bus masters, assumes a logic state to actuate the bus changeover switch so that the bus changeover switch is in a defined switch position.

3. The bus master switching unit according to claim 1, wherein the actuator includes application-specific integrated circuits with a plurality of inputs and outputs, the inputs and outputs being read to and read from by a connected one of the bus masters.

4. The bus master switching unit according to claim 3, wherein a bus transfer caused by a connected one of the bus masters is produced by a periodic signal change at at least one of the outputs of one of the application-specific integrated circuits, a signal change for another one of the bus masters being identified via at least one input of one of the application-specific integrated circuits.

5. The bus master switching unit according to claim 3, wherein a data transfer between a first one of the bus masters and a second one of the bus masters takes place via inputs and outputs of the application-specific integrated circuits.

6. The bus master switching unit according to claim 3, wherein the non-redundant bus system includes at least one data line, the at least one data line leading to each of the bus masters, bypassing the bus changeover switch.

7. A method for operating redundant bus masters on a non-redundant bus system, comprising:

providing a bus master switching unit for connecting one bus master of at least two redundant bus masters to the non-redundant bus system, the bus master switching unit including connections to connect in each case one of the at least two redundant bus masters to a connection of the non-redundant bus system, a bus changeover switch, and an actuator, connected to the non-redundant bus system to actuate the bus changeover switch;

actuating the actuator by one of the bus masters; and depending on a switch position of the bus master switching unit, the bus master switching unit connecting one of the redundant bus masters to the non-redundant bus system.

8. The method according to claim 7, wherein the actuator includes application-specific integrated circuits with a plurality of inputs and outputs, the method further comprising:

causing a transfer, by a connected one of the bus masters, via a periodic signal change at at least one of the outputs of one of the application-specific integrated circuits; and producing a signal change for another one of the bus masters via at least one input of one of the application-specific integrated circuits.

9. The method according to claim 7, wherein the actuator includes application-specific integrated circuits with a plurality of inputs and outputs, the method further comprising:

transferring data between a first one of the bus masters and a second one of the bus masters via the inputs and outputs of the application-specific integrated circuits.

10. The method according to claim 7, further comprising:

transferring data between a first one of the bus masters and a second one of the bus masters via an additional bus system.

11. A bus master switching unit for connecting a redundant bus master of at least two redundant bus masters to a non-redundant bus system, comprising:

connections, each of which connecting a different one of the redundant bus masters;

at least one connection to the non-redundant bus system;

a bus changeover switch, wherein depending on a switch position of the bus changeover switch, the bus changeover switch connecting a different one of the redundant bus masters to the non-redundant bus system so that the connected redundant bus master controls the non-redundant bus system; and an actuator to actuate the bus changeover switch, the actuator being actuated by at least one of the redundant bus masters.

12. A method for operating redundant bus masters on a non-redundant bus system, comprising:

providing a bus master switching unit for connecting one bus master of at least two redundant bus masters to the non-redundant bus system, the bus master switching unit including connections each of which connecting a different one of the at least two redundant bus masters to a connection of the non-redundant bus system, a bus changeover switch, and an actuator, connected to the non-redundant bus system to actuate the bus changeover switch;

actuating the actuator by one of the bus masters; and depending on a switch position of the bus master switching unit, the bus master switching unit connecting a different one of the redundant bus masters to the non-redundant bus system so that the connected redundant bus masters controls the bus system.

13. A bus system, comprising:

at least two redundant bus masters;

a non-redundant bus; and a bus master switching unit, including:

connections, each of which connecting a different one of the redundant bus masters;

at least one connection to the non-redundant bus;

a bus changeover switch, wherein depending on a switch position of the bus changeover switch, the bus changeover switch connects a different one of the redundant bus masters to the non-redundant bus so that the connected redundant bus master controls the bus; and an actuator to actuate the bus changeover switch, the actuator being actuated by at least one of the redundant bus masters.

* * * * *